United States Patent
Krause et al.

(10) Patent No.: US 6,776,669 B2
(45) Date of Patent: Aug. 17, 2004

(54) BATTERY CLAMP AND BATTERY

(75) Inventors: Jens Krause, Rahden (DE); Ludger Leve, Rahden (DE)

(73) Assignee: Harting Automotive GmbH & Co. KG (DE)

(*) Notice: Subject to any disclaimer, the term of this patent is extended or adjusted under 35 U.S.C. 154(b) by 0 days.

(21) Appl. No.: 10/124,946

(22) Filed: Apr. 18, 2002

(65) Prior Publication Data

US 2002/0160665 A1 Oct. 31, 2002

(30) Foreign Application Priority Data

Apr. 25, 2001 (DE) .......................................... 101 20 226

(51) Int. Cl.[7] .............................................. H01R 4/50
(52) U.S. Cl. ...................... 439/772; 439/388; 439/504; 439/759
(58) Field of Search ................................. 439/772, 762, 439/388, 504, 369, 370, 854, 522, 350, 757, 759, 761, 773

(56) References Cited

U.S. PATENT DOCUMENTS

| 1,767,903 | A | * | 6/1930 | Sparkes | ........................ 29/874 |
| 2,068,452 | A | | 1/1937 | Hansen | ........................ 173/259 |
| 3,568,139 | A | | 3/1971 | Deizer | ........................ 339/239 |
| 3,569,919 | A | | 3/1971 | Daddona, Jr. | ................ 339/258 |
| 3,663,927 | A | | 5/1972 | Bruner | ...................... 339/95 B |
| 4,033,664 | A | * | 7/1977 | Norman | ...................... 439/388 |
| 4,778,408 | A | | 10/1988 | Morrison | .................... 439/522 |
| 5,558,544 | A | * | 9/1996 | Okada et al. | ............... 439/762 |
| 5,716,243 | A | | 2/1998 | Kourimsky | .................. 439/773 |
| 5,915,758 | A | * | 6/1999 | Alfiero | ........................ 29/854 |
| 5,931,690 | A | | 8/1999 | Sai et al. | ..................... 439/350 |
| 6,030,722 | A | | 2/2000 | Kuboshima et al. | ......... 429/178 |
| 6,126,493 | A | * | 10/2000 | Price et al. | ............... 174/84 C |
| 6,203,382 | B1 | | 3/2001 | Frisby | ........................ 439/757 |
| 6,338,649 | B1 | * | 1/2002 | Smith | ......................... 411/552 |
| 6,409,553 | B1 | * | 6/2002 | Krause et al. | .............. 439/757 |

FOREIGN PATENT DOCUMENTS

| DE | 3942241 | 6/1927 | ............ H01R/4/26 |
| DE | 1250519 | 6/1965 | |
| FR | 1.024.106 | 3/1953 | |
| FR | 2 462 031 | 7/1979 | |

* cited by examiner

Primary Examiner—P. Austin Bradley
Assistant Examiner—Edwin A. Leon
(74) Attorney, Agent, or Firm—Hayes Soloway P.C.

(57) ABSTRACT

A battery clamp comprises a contact ring that can be placed on a battery contact of a battery to be connected, a spring ring capable of pressing the contact ring against the battery contact, and a press-on housing capable of pressing the spring ring against the contact ring. There is further proposed a battery which is particularly suitable for being used in combination with such a battery clamp.

38 Claims, 4 Drawing Sheets

BATTERY CLAMP AND BATTERY

TECHNICAL FIELD

The invention relates to a battery clamp by means of which a battery can be connected, in particular a vehicular starter motor battery, as well as to a battery which is particularly suitable for being used in combination with such a battery clamp.

BACKGROUND OF THE INVENTION

The problem during making contact with a battery contact is that for a reliable contacting there has to be maintained a defined contact force as precisely as possible. With the contact forces being too low, there will only be produced an insufficient metal-to-metal contact between battery contact and battery clamp. If, however, there are applied contact forces which are too high, this will result in a deformation and flowing of the battery contact material.

The most common battery clamp is comprised of a contact strap which is placed on the battery contact and subsequently is pulled tight by means of a screw bolt. It is a disadvantage with this type of battery clamp that the contact force which in fact is applied can be monitored only in an insufficient way. On the one hand, there is the danger that, by pulling tight of the screw bolt with a wrench, a much higher tightening moment and, thus, a much higher contact force is applied than would be actually required. On the other hand, there is the danger that, whenever the battery clamp is used with an already deformed battery contact, the contact strap is pulled to block by the screw bolt, so that a high tightening moment will be obtained for the screw bolt which, however, does not correspond with the lower contact force that will be achieved actually.

From prior art there are further known various battery clamps which employ spring elements that are intended to guarantee a constant contact force. These battery clamps, however, are of a comparably complicated construction.

BRIEF SUMMARY OF THE INVENTION

Therefore it is the object of the invention to provide a battery clamp which is able to be manufactured in a simple and cost-effective manner and at the same time is fail-proof in terms of process, i.e. a battery clamp which can be assembled with high reliability both manually and in an automated way, without the danger of faulty assembly occurring. It is further the object of the invention to further develop the known vehicle batteries to the effect that they are able to be implemented with such a battery clamp.

According to the invention, a battery clamp is provided which comprises a contact ring that can be placed on a battery contact of a battery to be connected, a spring ring capable of pressing the contact ring against the battery contact, and a press-on housing capable of pressing the spring ring against the contact ring. This battery clamp is based on the basic idea to use as few components as possible, which are of a simple construction and are optimally adapted to the function which is to be fulfilled by them. The contact ring, to which a battery cable may be crimped, serves exclusively for contacting the battery contact. The contact force by means of which the contact ring can be elastically pressed against the battery contact is provided by the spring ring. The press-on housing has merely the task to press the spring ring onto the contact ring.

According to the preferred embodiment it is provided for that the contact ring is provided with several elastic contact tabs that together form a ring, the middle axis of which is coincident with the middle axis of the battery contact to be contacted. In this arrangement, it is preferably provided for that the contact tabs are curved, so that they touch the battery contact in a region which is spaced from their free end at which the spring ring engages. Furthermore, it is preferably provided for that the free ends of the contact tabs are bent, so that the ring defined by the contact tabs has a slope surface at which the spring ring engages. With this design of the contact tabs, the spring ring may be slipped on the slope surface of the ring that is formed by the contact tabs, so that the contact tabs are elastically prestressed. The elastic prestress of the contact tabs is possible, because their point of contact with the battery contact is spaced from that region at which the spring ring engages the contact tabs. The prestress of the spring tabs adds to the prestress through the spring ring, so that even with settling phenomena between the contact tabs and the battery contact, there will be maintained a sufficient contact force over a long period of time.

According to the preferred embodiment of the invention it is provided for that the contact ring is provided with several holding lugs by means of which it is latched in place on the press-on housing. It is further provided for that the press-on housing is provided with several detent tabs which cooperate with the holding lugs. In this way, the press-on housing and the contact ring are joined into a unit.

According to the preferred embodiment of the invention, there is provided a press-on lid to which the press-on housing is attached. The press-on lid fulfills a number of functions. It can be provided with a projection which is able to engage into a recess in a skirt of a battery to be connected. It is in this way that there is made use of a lever effect by means of which the force can be increased which is applied by the press-on lid via the press-on housing onto the spring ring. Further, there can be provided a locking tab on the press-on lid, which locking tab is able to engage a skirt of a battery to be connected. This allows to lock the entire battery clamp on the battery.

According to the preferred embodiment it is provided for that the press-on lid is provided with two elongated slots and the press-on housing is provided with two pins which engage in the elongated slots. In this arrangement, the pins preferably lie on a line which intersects the middle axis of the battery contact to be contacted. This ensures that there will not occur any tilting forces during pressing on of the press-on housing, as the spring ring is loaded symmetrically.

According to the preferred embodiment of the invention there is provided a blocking tab which in a blocking position extends as far as into the space that is occupied by the battery contact, the blocking tab preventing in the blocking position the spring ring from being slipped on the contact ring, and the blocking tab being able to be brought by the battery contact into a release position in which the spring ring can be slipped on the contact ring. Thus, the blocking tab increases the process safety to this effect that the spring ring can only be slipped on the contact tabs of the contact ring if the contact ring is placed on a battery contact. An unintentional "closing" of the battery clamp prior to being correctly placed on a battery contact is prevented.

The above object is also solved by a battery that is wherein there are provided a battery contact and a skirt, the skirt surrounding the battery contact. On the one hand, the skirt serves as a mechanical protection for the battery contact. On the other hand, it opens new possibilities of fastening the battery clamp. The skirt may be provided with a recess, for example, which can be engaged by the projection of the press-on lid of the battery clamp. Furthermore, the skirt may be provided with a shoulder which can be engaged by the locking tab of the press-on lid of the battery clamp.

It is preferably made provision that the skirt is provided with a cut-out through which a connecting section of a contact ring extends, the contact ring being provided with a stop that cooperates with the skirt, so that a strain relief is produced. This makes sure that any forces that act on the connection cable, are not transferred to the battery contact and the battery clamp. Advantageous designs of the invention will be apparent from the sub-claims.

BRIEF DESCRIPTION OF THE DRAWINGS

FIG. 6 shows in a schematic view a battery contact with the contact ring placed on.

DETAILED DESCRIPTION OF THE PREFERRED EMBODIMENT

Figure 3:
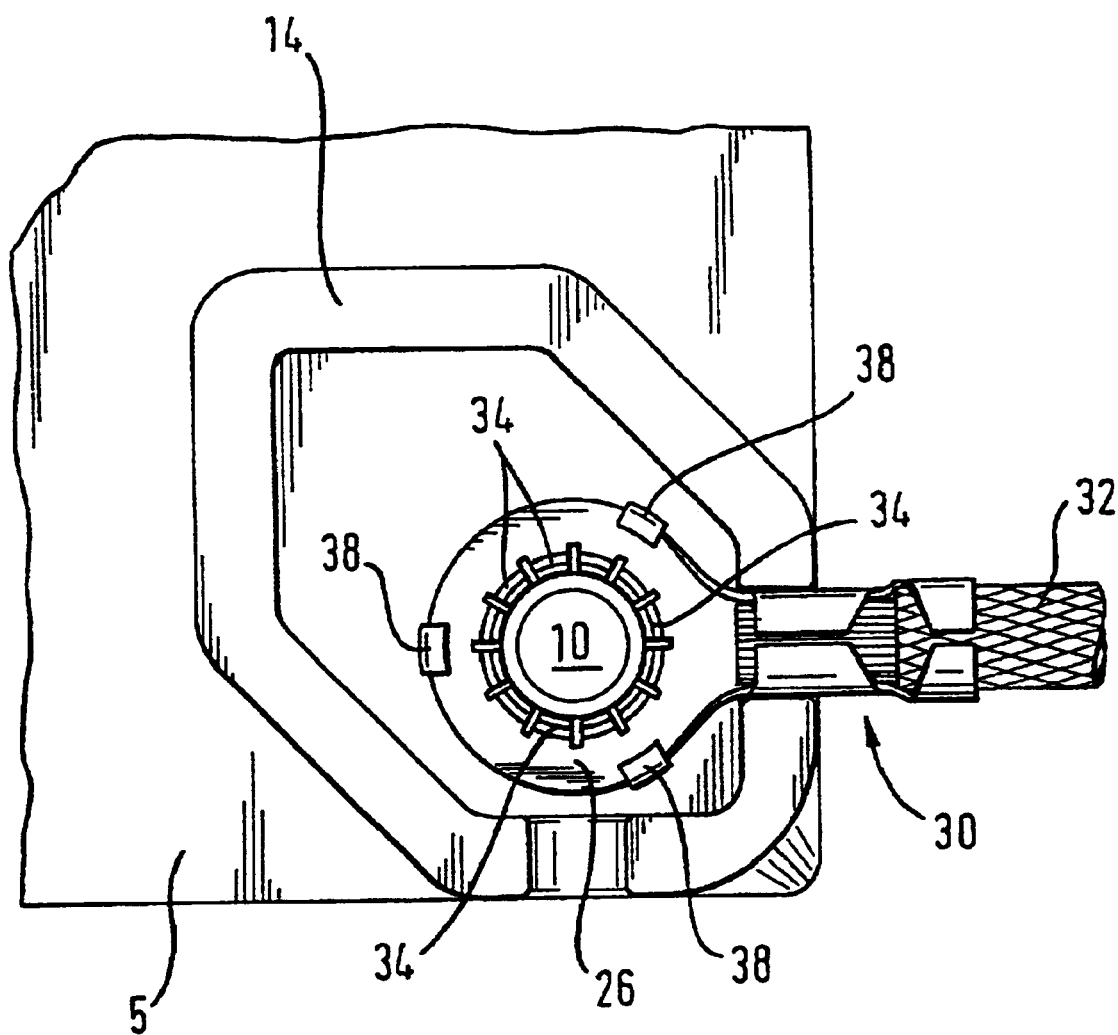
FIG. 3 is a partial top view onto the battery with the battery clamp being placed on, with all parts of the battery clamp having been removed except of the contact ring.
Figure 4:
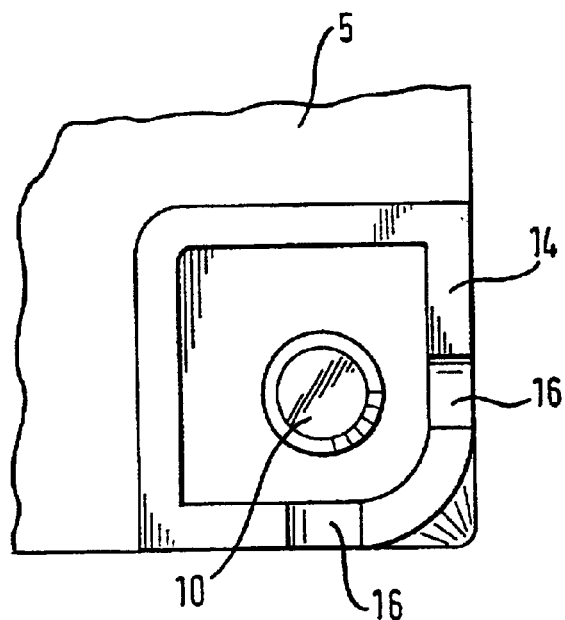
FIG. 4 is a schematic top view onto the battery with the battery clamp taken off.

First, the battery will be described by means of FIG. 3. This battery concerns a vehicular starter motor battery, through which may be delivered electric energy to a starter motor of a combustion engine of a motor vehicle. The battery, here referenced by reference numeral 5, usually has two battery contacts 10 of which only one is shown here. The relative arrangement of the battery contacts to each other as well as the design of the battery is not of importance here, so that the battery is only indicated schematically and in sections here.

Unlike with conventional battery contacts, the battery contact 10 is designed to be cylindrical (see in particular FIGS. 1 and 2) and is merely provided with a comparably short conical section 12 at its end. With a cylindrical battery contact, there will not occur any forces acting in longitudinal direction of the battery contact if a battery clamp is being placed on it.

Figure 5:
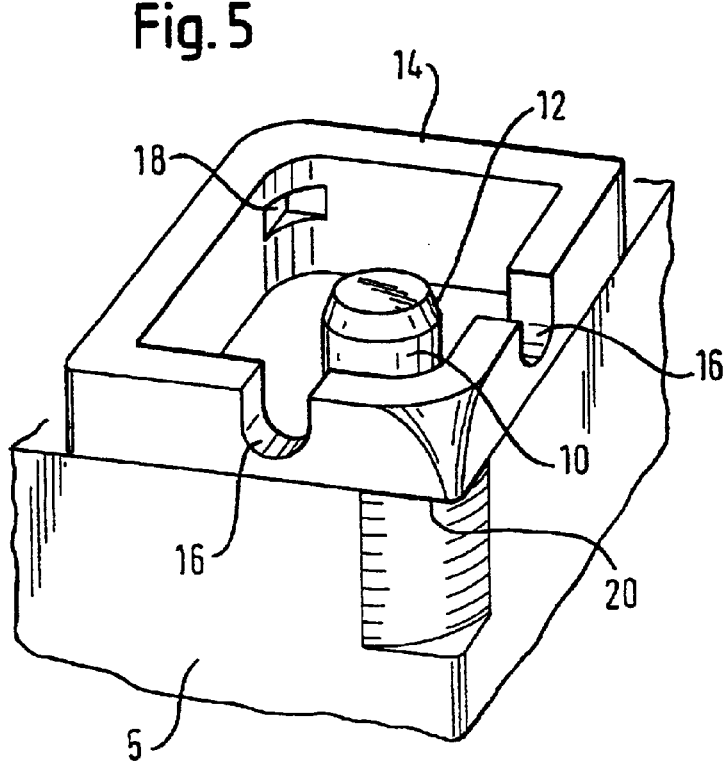
FIG. 5 is a perspective, partial view of the battery.

The battery is provided with a skirt 14 which completely surrounds the battery contact. The skirt 14 is provided with two cut-outs 16 which with respect to the middle axis of the battery contact are arranged at an angle of 90° relative to each other. The function of the cut-outs 16 will be explained later. Further provided in the skirt 14 is a recess 18 (see FIG. 5), and a shoulder 20 is formed on the skirt. The function of recess 18 and shoulder 20 will likewise be explained later.

The essential components of the battery clamp are a press-on housing 22, a spring ring 24 as well as a contact ring 26.

Figure 6:
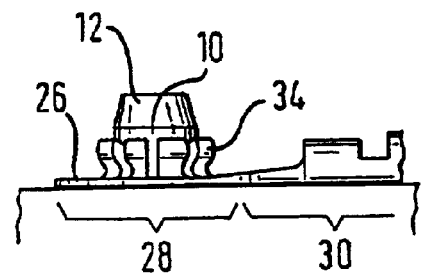
Figure 7:
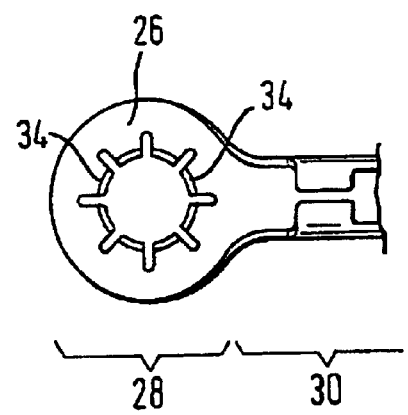
FIG. 7 shows the battery clamp in a bottom view.

The contact ring 26 (see in particular FIGS. 3, 6 and 7) consists of a sheet metal having a contact portion 28 and a connecting portion 30. The contact portion 28 serves for contacting the battery contact 10, and the connecting portion 30 serves for connecting a battery cable 32, for instance by crimping.

Figure 1:
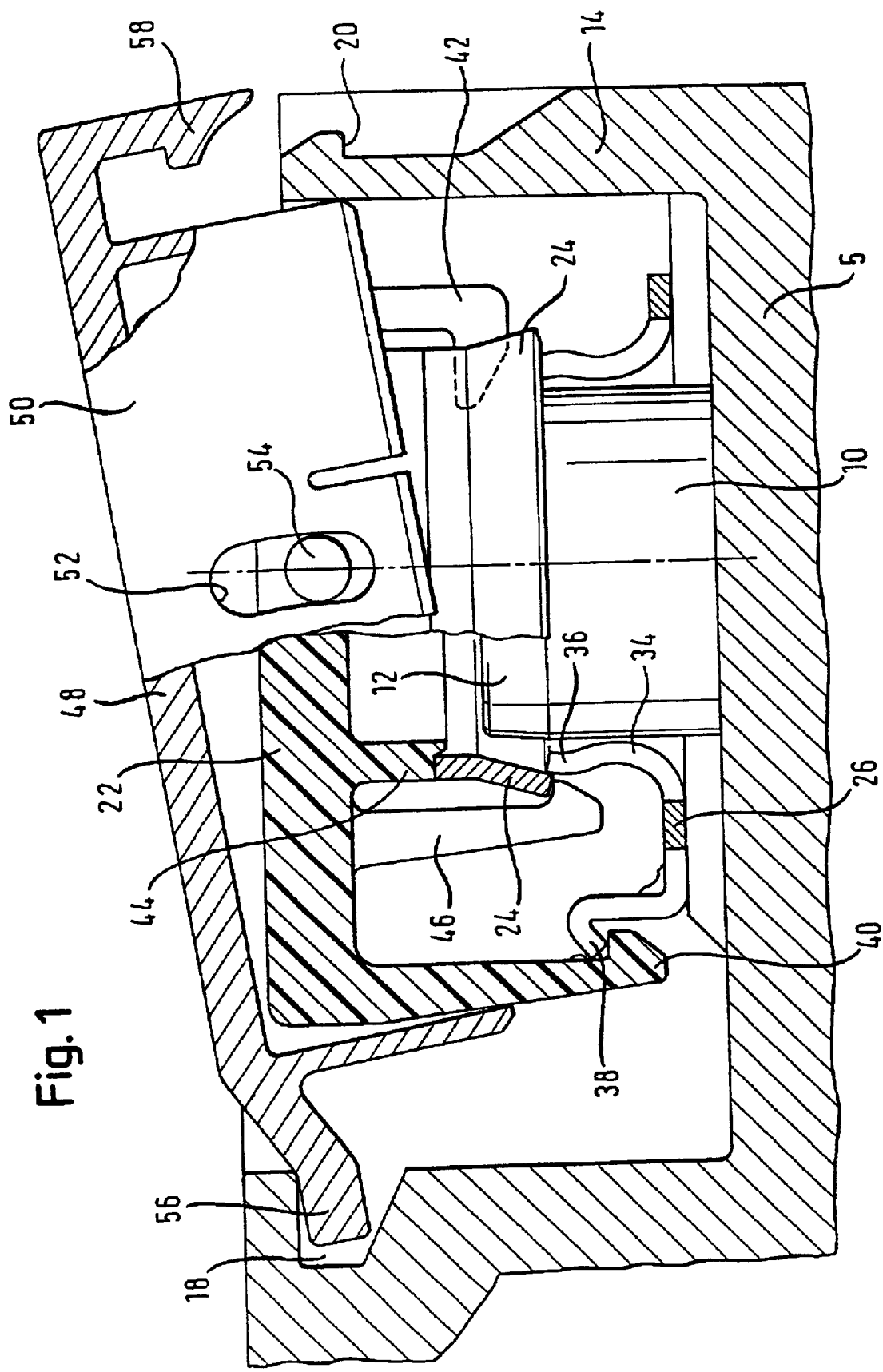
FIG. 1 shows in a schematic, broken view a battery with the placed-on battery clamp in the open state.
Figure 2:
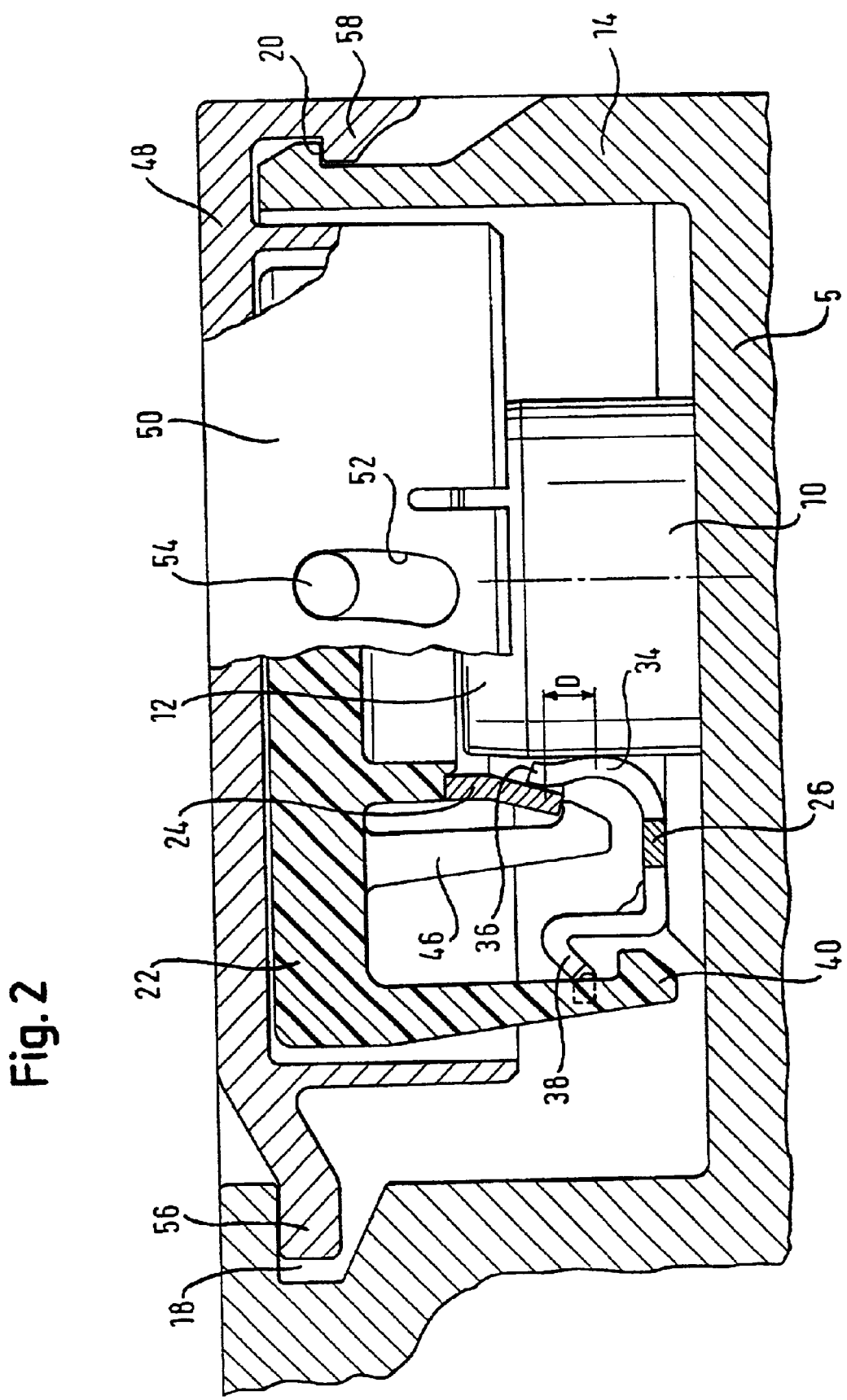
FIG. 2 shows the battery and the battery clamp of FIG. 1 in the closed state.

The contact portion 28 is provided with several contact tabs 34 lying side by side, which are bent upwards by approximately 90° from the plane of the connecting portion (see in particular FIGS. 1 and 2). All the contact tabs 34 together form a discontinuous ring which concentrically surrounds the battery contact to be contacted. Here, each individual contact tab is bent such that the smallest diameter of the ring which is formed, that is the region resting at the battery contact, is situated approximately in the middle between the material ring which connects the contact tabs which each other, and the free end of the contact tabs. The free end 36 of each contact tab is bent such that all the contact tabs together form a discontinuous slope surface that can be engaged by the spring ring 24.

Finally, the contact ring 26 is provided with three holding lugs 38 which cooperate with corresponding detent tabs 40 on the press-on housing 22, in order to secure the contact ring 26 to the press-on housing 22.

The press-on housing 22 consists of plastics material and is provided with a blocking tab 42 (see FIG. 1) which in a blocking position may extend as far as into the space that can be occupied by the battery contact 10. In the blocking position, the blocking tab 42 prevents that the spring ring 24 is able to be slipped on the contact tabs 34 of the contact ring 26, if the battery clamp is not properly arranged on a battery contact. If the battery clamp is properly placed on the battery contact 10, then the blocking tab 42 will be forced outwards by the latter into a release position in which the battery clamp can be firmly attached to the battery contact.

The press-on housing 22 is provided with a press-on ring 44 which supports the spring ring 24. To this end, the press-on ring 44 is provided on its inner side with a slightly raised edge. Provided on the press-on housing 22 are several spring tabs 46 which engage on the spring ring 24 and hold it on the press-on ring 44.

Attached to the press-on housing 22 is a press-on lid 48 which completely covers the press-on housing 22 on its outside. The press-on lid 48 is provided with two side elements 50, with an elongated hole 52 being formed in each of these side elements. Each elongated hole 52 is engaged by a pin 54 formed on the press-on housing 22. The press-on lid 48 is further provided with a projection 56 which engages into a recess 18 in the skirt 14 of the battery. On the opposite side, the press-on lid 48 is provided with a locking tab 58 which is able to cooperate with the shoulder 20 on the skirt 14 of the battery.

The battery clamp described is assembled in the following way: First, the spring ring 24 is placed on the press-on ring 44 in the press-on housing 22 where it is held by the spring tabs 46. Then, the contact ring 26 is mounted such that the holding lugs 38 of the contact ring snap in place behind the detent tabs 40 of the press-on housing 22. Finally, the press-on lid 48 is placed on the press-on housing 22 in such a manner that the pins 54 engage the elongated holes 52.

For reliably connecting all components with each other, only simple working steps are necessary for assembling the battery clamp, because the components automatically latch into each other, so that a completely assembled unit is obtained.

The battery clamp is mounted to the battery in the following way: The battery clamp is inserted in the skirt such that the projection 56 engages into the recess 18 and the connecting portion 30 of the contact ring 26 extends through one of the cut-outs 16 of the skirt. Due to the fact that there are provided two cut-outs, it is ensured that the connecting portion and the battery cable 32 connected thereto always extend in a direction which is suitable for the particular mounting situation. The contact ring 26 is designed such that the connecting portion 28 on the inside of the skirt rests at both sides of the cut-out 16, so that a strain relief is established. Alternatively, a stop may also be provided on the contact ring 26, which stop rests at the skirt 14.

Immediately after insertion of the battery clamp into the skirt 14 of the battery, the battery clamp is in the condition shown in FIG. 1. The press-on lid 48 extends slightly upwards, and the spring ring 24 is spaced from the contact tabs 34 of the contact ring 26. If desired, the battery contact 10 and the contact tabs 34 may be sized with respect to each other such that, already in this condition, the contact tabs rest at the battery contact with a slight prestress.

In order to finish mounting of the battery clamp, the press-on lid 48—starting from the condition shown in FIG. 1—is forced downwards into the position shown in FIG. 2, until the locking tab 58 snaps in place behind the shoulder 20 of the skirt 14. In so doing, the press-on housing 22 is forced downwards with respect to FIGS. 1 and 2, so that the spring ring 24 is slipped on the free ends 36 of the contact tabs 34. Simultaneously, the spring ring 24 which is conically expanded on its side facing the contact tabs 34, presses the contact tabs 34 against the battery contact in an elastic fashion, so that the required contact force is produced at that place. As can be seen from FIG. 2, the spot of contact between the contact tabs 34 and the battery contact 10 is spaced by a distance D from the region of contact between the contact tabs 34 and the spring ring 24. This distance D results in the contact tabs 34 being elastically prestressed. Hence, the battery clamp has a large reserve which allows to compensate for any settling processes between the battery contact 10 and the contact tabs 34.

The press-on lid 48 is designed such that it completely covers the region of the battery lying within the skirt 14 and consequently the battery contact 10. Furthermore, the press-on lid 48 can be designed such it largely closes the cutouts 16 in the skirt 14. An erroneous contacting with contact cramps, for example, is prevented since the battery contact is completely covered by the skirt 14 and the press-on lid 48.

For disconnecting the battery clamp, the locking tab 58 is pulled outwards, so that it comes off the shoulder 20. Subsequently, the press-on lid 48 can be pulled off in upward direction, which entrains the press-on housing 22 and the spring ring 24. With this, the contact tabs 34 are freed and the battery clamp can be pulled off from the battery contact.

What is claimed is:

1. A battery clamp comprising a contact ring that can be placed on a battery contact of a battery to be connected, a spring ring capable of pressing said contact ring against said battery contact, and a press-on housing capable of pressing said spring ring against said contact ring;
   wherein said contact ring is provided with several elastic contact tabs that together form a ring, a middle axis of which being coincident with a middle axis of said battery contact to be contacted;
   said contact tabs are curved, so that they touch said battery contact in a region which is spaced from their free end at which said spring ring engages; and
   said contact tabs have free ends that are bent, so that a ring defined by said contact tabs has a slope surface at which said spring ring engages.

2. The battery clamp according to claim 1, wherein said contact ring is provided with a stop which may rest at a skirt of a battery to be connected, so that it acts as a strain relief.

3. The battery clamp according to claim 1, wherein at least one blocking tab is provided which in a blocking position extends as far as into a space that is occupied by said battery contact, said blocking tab preventing in a blocking position said spring ring from being slipped on said contact ring, and said blocking tab being able to be brought by said battery contact into a release position in which said spring ring can be slipped on said contact ring.

4. The battery clamp according to claim 1, wherein said contact ring is provided with several holding lugs by means of which it is latched in place on said press-on housing.

5. The battery clamp according to claim 4, wherein said press-on housing is provided with several detent tabs which cooperate with said holding lugs.

6. The battery clamp according to claim 1, wherein said press-on housing has a press-on ring through which said spring ring is supported.

7. The battery clamp according to claim 6, wherein said press-on housing has several spring tabs which engage said spring ring and hold it on said press-on ring.

8. The battery clamp according to claim 6, wherein said press-on ring is configured in one piece with said press-on housing.

9. The battery clamp according to claim 1, wherein a press-on lid is provided, attached to which is said press-on housing.

10. The battery clamp according to claim 9, wherein said press-on lid is provided with two elongated slots and said press-on housing is provided with two pins which engage in said elongated slots.

11. The battery clamp according to claim 10, wherein said pins lie on a line which intersects said middle axis of said battery contact to be contacted.

12. The battery clamp according to claim 9, wherein said press-on lid is provided with a projection which is capable of engaging into a recess in a skirt of a battery to be connected.

13. The battery clamp according to claim 12, wherein said press-on lid is provided with a locking tab which is capable of engaging a shoulder in said skirt of said battery to be connected.

14. A battery clamp comprising a contact ring that can be placed on a battery contact of a battery to be connected, a spring ring capable of pressing said contact ring against said battery contact, and a press-on housing capable of pressing said spring ring against said contact ring;
   a press-on lid is provided, attached to which is said press-on housing;
   said press-on lid is provided with two elongated slots and said press-on housing is provided with two pins which is said elongated slots; and
   said pins lie on a line which intersects said middle axis of said battery contact to be contacted.

15. The battery clamp according to claim 14, wherein said contact ring is provided at a stop which may rest at a skirt of a battery to be connected, so that it acts as a strain relief.

16. The battery clamp according to claim 14, wherein at least one blocking tab is provided which in a blocking position extends as far as into a space that is occupied by said battery contact, said blocking tab preventing in a blocking position said spring ring from being slipped on said contact ring, and said blocking tab being able to be brought by said battery contact into a release position in which said spring ring can be slipped on said contact ring.

17. The battery clamp according to claim 14, wherein said contact ring is provided with several elastic contact tabs that together form a ring, a middle axis of which being coincident with a middle axis of said battery contact to be contacted.

18. The battery clamp according to claim 17, wherein said contact tabs are curved, so that they touch said battery contact in a region which is spaced from their free end at which said spring ring engages.

19. The battery clamp according to claim 14, wherein said contact ring is provided with several holding lugs by means of which it is latched in place on said press-on housing.

20. The battery clamp according to claim 19, wherein said press-on housing is provided with several detent tabs which cooperate with said holding lugs.

21. The battery clamp according to claim 14, wherein said press-on housing has a press-on ring through which said spring ring is supported.

22. The battery clamp according to claim 21, wherein said press-on housing has several spring tabs which engage said spring ring and hold it on said press-on ring.

23. The battery clamp according to claim 21, wherein said press-on ring is configured in one piece with said press-on housing.

24. The battery clamp according to claim 14, wherein said press-on lid is provided with a projection which is capable of engaging into a recess in a skirt of a battery to be connected.

25. The battery clamp according to claim 24, wherein said press-on lid is provided with a locking tab which is capable of engaging a shoulder in said skirt of said battery to be connected.

26. A battery clamp comprising a contact ring that can be placed on a battery contact of a batter to be connected, a spring ring capable of pressing said contact ring against said battery contact, and a press-on housing capable of pressing said spring ring against said contact ring;
wherein at least one blocking tab is provided which in a blocking position extends as far as into a space that is occupied by said battery contact, said blocking tab preventing in a blocking position said spring ring from being slipped on said contact ring, and said blocking tab being able to be brought by said battery contact into a release position in which said spring ring can be slipped on said contact ring.

27. The battery clamp according to claim 26, wherein said contact ring is provided with a stop which may rest at a skirt of a battery to be connected, so that it acts as a strain relief.

28. The battery clamp according to claim 26, wherein said contact ring is provided with several elastic contact tabs that together form a ring, a middle axis of which being coincident with a middle axis of said battery contact to be contacted.

29. The battery clamp according to claim 28, wherein said contact tabs are curved, so that they touch said battery contact in a region which is spaced from their free end at which said spring ring engages.

30. The battery clamp according to claim 26, wherein said contact ring is provided with several holding lugs by means of which it is latched in place on said press-on housing.

31. The battery clamp according to claim 30, wherein said press-on housing is provided with several detent tabs which cooperate with said holding lugs.

32. The battery clamp according to claim 26, wherein said press-on housing has a press-on ring through which said spring ring is supported.

33. The battery clamp according to claim 32, wherein said press-on housing has several spring tabs which engage said spring ring and hold it on said press-on ring.

34. The battery clamp according to claim 32, wherein said press-on ring is configured in one piece with said press-on housing.

35. The battery clamp according to claim 26, wherein a press-on lid is provided, attached to which is said press-on housing.

36. The battery clamp according to claim 35, wherein said press-on lid is provided with two elongated slots and said press-on housing is provided with two pins which engage in said elongated slots.

37. The battery clamp according to claim 35, wherein said press-on lid is provided with a projection which is capable of engaging into a recess in a skirt of a battery to be connected.

38. The battery clamp according to claim 37, wherein said press-on lid is provided with a locking tab which is capable of engaging a shoulder in said skirt of said battery to be connected.

* * * * *